(12) United States Patent
Iba

(10) Patent No.: US 11,878,411 B2
(45) Date of Patent: Jan. 23, 2024

(54) SYSTEM FOR ATTACHING SEAL MEMBER ON OBJECT AND METHOD FOR CONTROLLING IN THE ATTACHMENT SYSTEM

(71) Applicant: DENSO WAVE INCORPORATED, Aichi-pref. (JP)

(72) Inventor: Ayumi Iba, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 155 days.

(21) Appl. No.: 17/228,804

(22) Filed: Apr. 13, 2021

(65) Prior Publication Data

US 2021/0323172 A1 Oct. 21, 2021

(30) Foreign Application Priority Data

Apr. 13, 2020 (JP) ................. 2020-071657

(51) Int. Cl.
*B25J 15/06* (2006.01)
*B25J 15/00* (2006.01)
*B25J 9/16* (2006.01)
*B60J 10/00* (2016.01)

(52) U.S. Cl.
CPC ......... *B25J 15/0616* (2013.01); *B25J 9/1612* (2013.01); *B25J 9/1664* (2013.01); *B25J 15/0052* (2013.01); *B60J 10/45* (2016.02)

(58) Field of Classification Search
CPC .... B25J 9/1612; B25J 9/1664; B25J 15/0616; B25J 15/0052; B66C 1/0243; B66C 1/0256; B60J 10/45; B65G 47/914; B65G 47/918; B65H 3/0816; B65H 3/0833; B65H 3/0841; B65H 3/0883

USPC ......................................... 294/188
See application file for complete search history.

(56) References Cited

U.S. PATENT DOCUMENTS 4,527,783 A * 7/1985 Collora ................. B25B 11/005
269/297
5,556,505 A * 9/1996 Hill ................... B32B 17/10036
414/793.1
5,676,364 A * 10/1997 Shiiki .................. B65H 3/0816
271/106

(Continued)

FOREIGN PATENT DOCUMENTS

JP  H05-310237 A  11/1993
JP  2018-203436 A  12/2018

*Primary Examiner* — Dean J Kramer
(74) *Attorney, Agent, or Firm* — Oliff PLC

(57) ABSTRACT

In attachment system provided with an industrial robot having a hand movable at an arm tip, a base is attached to the hand. The base supports a plurality of suction pads such that angles of virtual suction surfaces including suction pad ends intersect each other in a hand operating space. Under control of a control device, the respective pads suction a sealing material at the respective suction surfaces, and the position and orientation of the base is controlled in the operating space such that partial suction surfaces face a designated attachment position on the object. Further, an attachment surface of the sealing material is partially attached to the designated attachment position on the object, in a state the sealing material to part of which the partial suction pads are suctioned is still faced to the designated attachment position. Such steps are repeated for the remaining attachment positions of the object.

17 Claims, 13 Drawing Sheets

(56) References Cited

U.S. PATENT DOCUMENTS

| | | | | |
|---|---|---|---|---|
| 6,345,818 B1* | 2/2002 | Stephan | ............... | B25J 15/0616 |
| | | | | 271/106 |
| 6,604,623 B2* | 8/2003 | Sumi | .................... | B65G 47/843 |
| | | | | 198/377.08 |
| 2014/0147239 A1 | 5/2014 | Miyoshi | | |
| 2018/0065820 A1* | 3/2018 | Litvak | ..................... | B65H 3/48 |

* cited by examiner

SYSTEM FOR ATTACHING SEAL MEMBER ON OBJECT AND METHOD FOR CONTROLLING IN THE ATTACHMENT SYSTEM

CROSS-REFERENCE TO RELATED APPLICATION

This application is based on and claims the benefit of priorities from earlier Japanese Patent Application No. 2020-071657 filed Apr. 13, 2020, the description of which is incorporated herein by reference.

BACKGROUND

Technical Field

The present invention relates to a system in which a sealing material is attached to an object member by a robot and an attachment control method for the same, and in particular, to a system and a method for controlling attachment of a sealing material which is elongated (also referred to as a "linear, strip-like shape, or linear shape) in plan view, to an object having a complicated surface shape.

Background Art

Document PTL 1, for example, discloses a technique in which a protective sticker label is automatically attached, by a device, to a light-receiving surface of a CCD (Charge Coupled Device) used for a video camera, which has conventionally been performed manually.

CITATION LIST

Patent Literature

PTL 1: JP H05-310237 A

SUMMARY

Technical Problem

However, the sticker label described in PTL 1 is a planar rectangular label. Examples of the sealing label in PTL 1 include a sealing material interposed between a door of a vehicle and a body of the vehicle to secure airtightness of the vehicle when the door of the vehicle is closed. However, such a sealing material has an elongated shape (linear shape) in plan view, and its form is greatly different from that of the sealing label disclosed in PTL 1. Therefore, the device disclosed in PTL 1 is not applicable to attaching the sealing materials as described above.

SUMMARY

The present disclosure has been made in view of the above circumstances, and an object thereof is to provide a sealing material attachment system for automatically attaching a sealing material which is elongated in plan view to an object having a complicated external surface.

Solution to Problem

A sealing material attachment system according to a first aspect of the present disclosure is a system for attaching a sealing material having an attachment surface to an object, the sealing material having an elongated shape having two directions consisting of a first edge direction and second edge direction intersecting each other, the first edge direction being longer than the second edge direction. Here, the elongated shape means a shape relatively long in one direction when the sealing material is viewed in plan view, and is also referred to as a strip shape or narrow rectangular shape. Since the first edge direction is longer than the second edge direction, the elongated shape may be referred to as a "linear shape" representing this "long" state. The sealing material attachment system includes:

a robot having a hand which is movable at the tip of an arm;

a plurality of suction pads each having a suction surface at the tip of the suction pad, the suction surface passing through a suction end capable of abutting on the object;

a base attached to the hand, supporting the plurality of suction pads, and attached so that angles of virtual planes including suction surfaces of the suction pads intersect each other in an operating space of the hand; and a control device that controls an operation of the hand of the robot and respectively controls the suction applied to the sealing material conducted by each of the plurality of suction pads.

The control device includes
a suction command means for suctioning the sealing material to each suction surface of the plurality of suction pads, a positioning control means for controlling, for each partial attachment operation of the sealing material, the position and orientation of the base in the operation space so that the suction surface of one of the plurality of suction pads is arranged to be face a predetermined attachment position of the object, an attachment control means for partially attaching the attachment surface of the sealing material, to which one of the suction pads arranged to be face the attachment position by the positioning control means is suctioned, to the attachment position of the object, for each partial attachment operation of the sealing material, and a first suction stop means for stopping suction operated by one of the suction pads for each partial attachment operation of the sealing material after finishing partial attachment operated by the attachment control.

In other words, a hand of a robot includes a base having a shape in which each of the plurality of suction pads is mounted such that a virtual suction surface including their suction ends virtually intersects an operating space of the hand. Therefore, when the sealing material is suctioned by the suction pads, the control device controls the suction surface of at least one of the suction pads to be arranged to face the corresponding attachment position of the attachment object. Then, the control device executes the operation consisting of partially attaching the sealing material and stopping suction by the suction pad by sequentially switching the suction pads from a suction pad provided on a first end side of the base to a suction pad provided on a second end side of the base.

With such a structure, by changing the angle of the base, at least one of the plurality of suction pads is arranged to face a portion to be suctioned, and the sealing material which is elongated in a linear plan view, such as a narrow rectangular (linear or strip-shaped) sealing material, is partially suctioned by the suction pads. Therefore, the entire linear sealing material can be easily suctioned only using the hand of the robot. Similarly, when the sealing material is attached to the attachment object, by sequentially executing the operation consisting of arranging the plurality of suction pads to face a portion to be suctioned and stopping the suction, the sealing material can be attached to each part between the plurality of the suction pads. Thus, the work of attaching the elongated sealing material to the attachment object can be automated by using the robot.

The functions performed according to the above configuration may be described as a sealing material attachment control method, and may be characterized by including the above partial attachment step.

As an example, according to the sealing material attachment system, the shape of the base is curved to be convex in a predetermined direction (for example, to draw an arc around the robot arm tip). As a result, the suction surfaces which virtually include the suction ends of the suction pads become a plurality of surfaces having different slopes, that is, surfaces which spatially intersect each other. Thus, by moving and rotating the base through the robot arm, the specific suction pad out of the plurality of suction pads can be projected toward the object to be attached. Thus, if the surface structure of the attachment position of the object to be attached is three-dimensionally complex, the attachment can be partially performed, that is, the attachment can be performed by each part of the plurality of suction pads (for example, by each suction pad).

As another example, according to the above sealing material attachment system, it is advantageous to attach a sealing material to an object having a three-dimensional shape. That is, as described above, the sealing material can be partially attached to the object at each attachment position of the object by changing the angle of the base. Therefore, if the object has a configuration in which an angle of the attachment object surface of the object is three-dimensionally changed, the sealing material can be partially attached in accordance with the change of the angle.

As another example, according to the sealing material attachment system, the plurality of suction pads are disposed on the base to be in alignment with the position where the angle at which the sealing material is attached to the attachment object changes in the same plane. Thus, the robot can perform control for changing the attachment angle of the sealing material in accordance with a position where suction by the corresponding suction pad 19 is stopped, resulting in facilitating teaching of the robot.

As yet another example, according to the sealing material attachment system, when the control device performs suction of the sealing material, the control device first suctions a first end of the sealing material using a suction pad which is provided on one end side of the base. Then, the hand is moved in a direction along which the sealing material is arranged by a distance in which the first end of the sealing material is peeled off followed by suction by the remaining suction pads.

With this control, the sealing material disposed in a state where the adhesive surface thereof is adhered to the mount or the like and can be easily peeled off and removed from the mount or the like by bringing the sealing material into a state where the first end thereof is slightly peeled off and then performing suction to the remaining portion of the sealing material.

As another example, according to the above sealing material attachment system, the control device moves the hand by a distance in which the first end of the sealing material is peeled off, and then stops the suction temporarily. Then, the control device suctions the first end of the sealing material again using the suction pad provided on one end side of the base, and then suctions the sealing material sequentially using the remaining suction pads.

With such control, if, for example, the sealing material is wrinkled or the suction position of the suction pad which is provide on one end side of the base is slightly deviated from the actual suction position when the first end of the sealing material is slightly peeled off, such a state can be eliminated by performing suction again.

As another example, according to the above sealing material attachment system, the first end of the sealing material corresponds to the second end side of the base. Thus, when the hand with the entire sealing material suctioned is moved to the first attachment position, the suction pad on the first end side of the base is arranged to face the first attachment position, and attachment of the sealing material can be started immediately. Therefore, suction and attachment of the sealing material is efficiently performed.

As another example, according to the above sealing material attachment system, when the sealing material is partially attached to one attachment position, the control device stretches the sealing material in a direction forward to the next attachment position to the degree that tension is generated in the sealing material, and then moves the hand to the next attachment position. Thus, the sealing material can be prevented having parts that are wrinkled when attached.

DETAILED DESCRIPTIONS OF THE EMBODIMENTS

Figure 1:
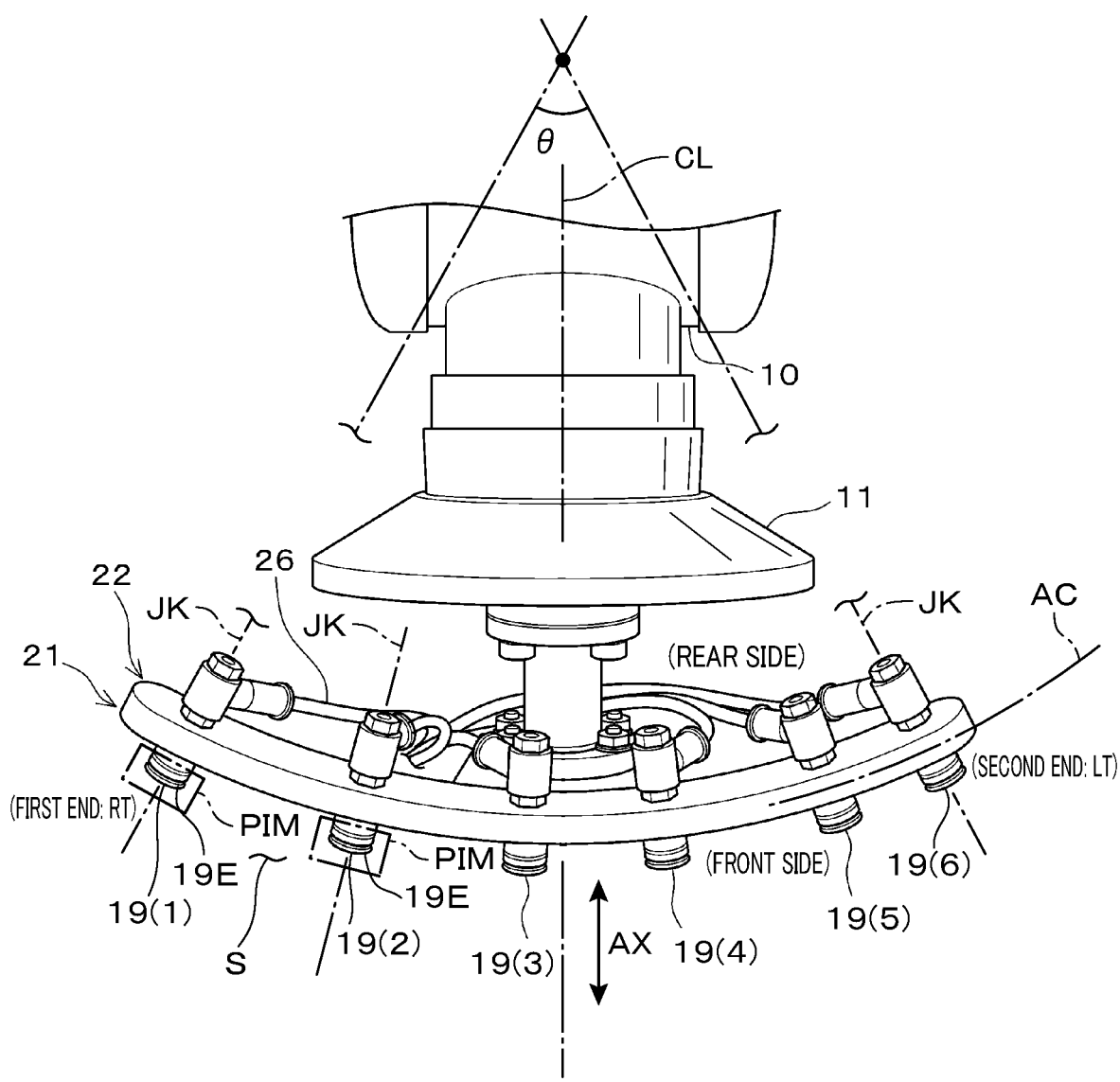
FIG. 1 is a perspective view showing a hand of a robot according to an embodiment.
Figure 2:
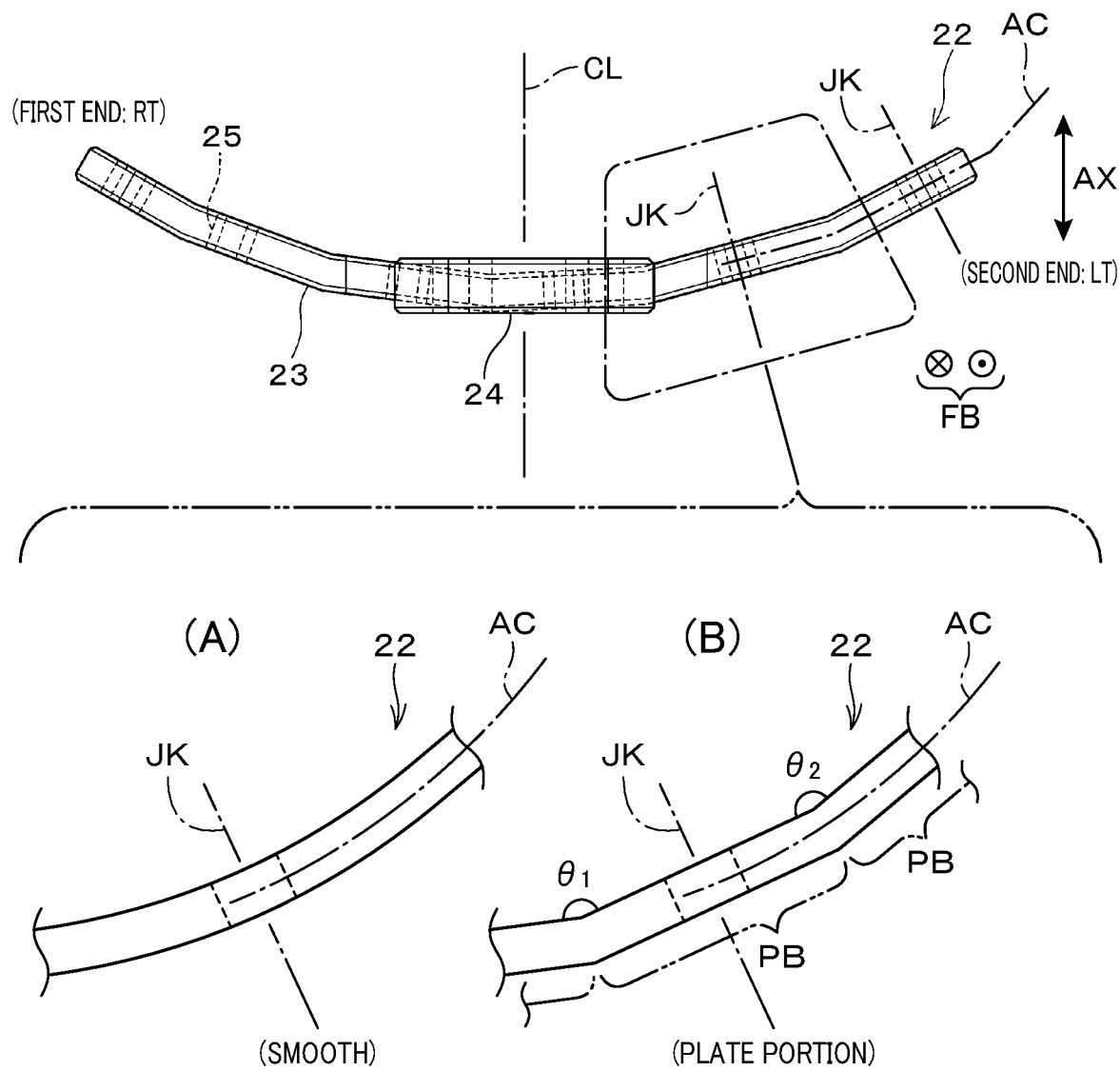
FIG. 2 is a rear view of a base member of the hand as viewed in the front-rear direction, according to an embodiment and a modification.

Hereinafter, with reference to FIGS. 1 to 16, a sealing material attachment system and attachment control method for the system according to an embodiment will be described. In FIG. 2 which shows the base member to be described later, a modification of the base member will also be partially described.

First, with reference to FIG. 4, the configuration of a robot system 1 will be described.

The robot system 1 is a core element of the sealing material attachment system according to the embodiment, and the sealing material attachment system includes the robot system 1 and a base member and a plurality of suction pads described later as main elements.

Figure 4:
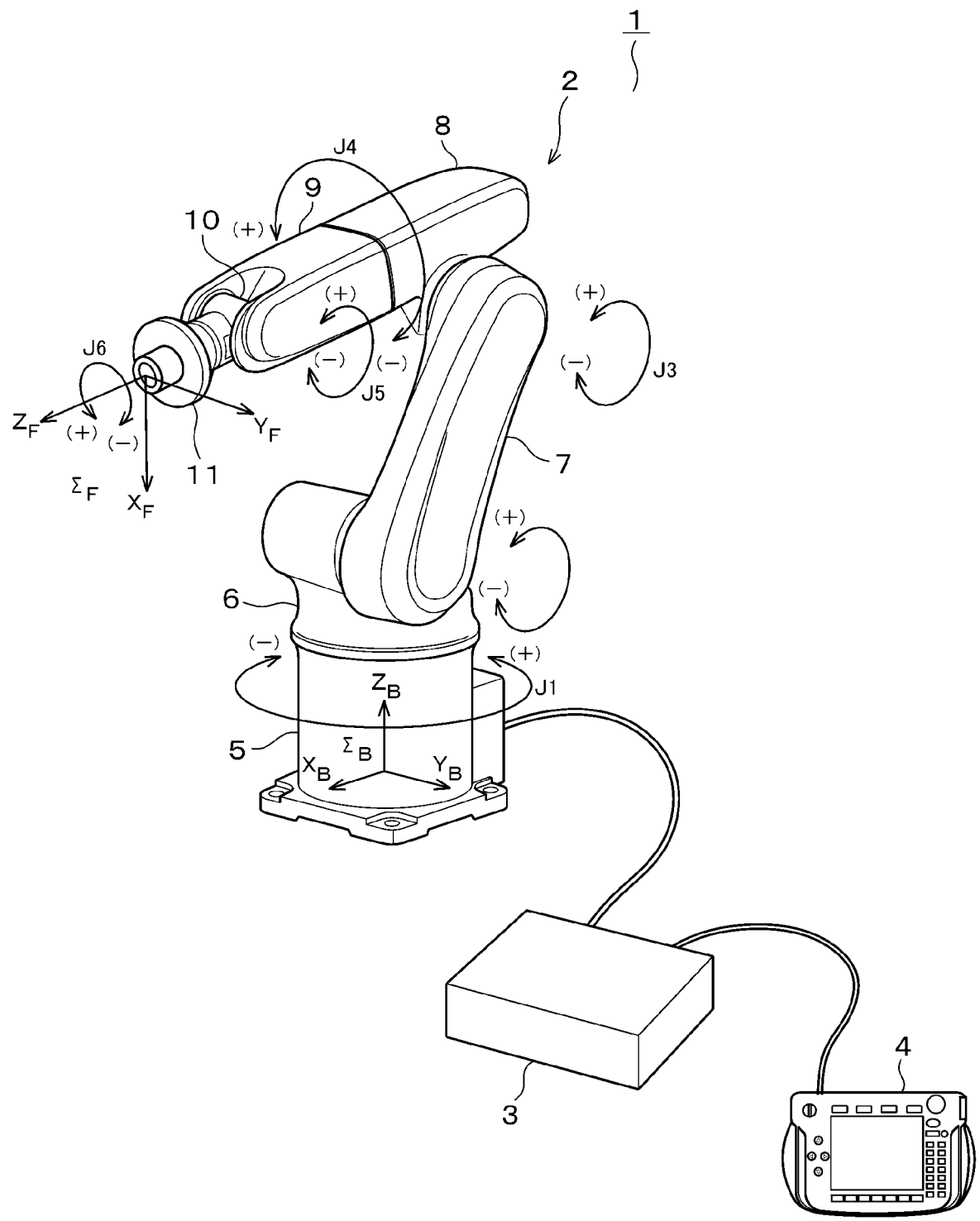
FIG. 4 is a diagram illustrating a configuration of a system including the robot.

As shown in FIG. 4, the robot system 1 includes an articulated robot 2, a controller 3 that controls the robot 2, and a teaching pendant 4 connected to the controller 3. The robot 2 has a known configuration as a six-axis vertical articulated robot, and a shoulder 6 is rotatably connected to a base 5 in the horizontal direction via a first axis (J1) having an axis center in the Z direction. A lower end of a lower arm 7 extending upward through a second axis (J2) having an axis center in the Y direction is vertically rotatably connected to the shoulder 6. A first upper arm 8 is vertically rotatably connected to the distal end of the lower arm 7 via a third axis (J3) having an axis center in the Y direction. To an end portion of the first upper arm 8, a second upper arm 9 is connected in a torsionally rotatable manner via a fourth axis (J4) having an axis center in X direction. The wrist 10 is vertically rotatably connected to an end portion of the second upper arm 9 via a fifth axis (J5) having an axis center in Y direction. To the wrist 10, a flange 11 is connected in a torsionally rotatable manner via a sixth axis (J6) having an axis center in X direction.

The base 5, the shoulder 6, the lower arm 7, the first upper arm 8, the second upper arm 9, the wrist 10, and the flange 11 function as arms of the robot 2, and a hand 21 is attached to the flange 11 which is a tip of the arm. Therefore, as shown in FIG. 1, the direction passing through the center axis CL of the flange 11 can be assumed to be the axial direction AX.

The hand 21 of the present embodiment is configured to have a shape required for a special application to suck and attach a sealing material to be interposed between a door of a vehicle and a body of the vehicle, and further details will be described later. Each of the shafts 31 to 36 of the robot 2 is provided with a motor 12 shown in FIG. 5, the motor 12 providing driving source to the individual shafts.

The controller 3, which corresponds to a control device of the robot, controls the operation of the robot 2 by executing a computer program previously stored in a ROM in a control unit 13 composed of a computer CP composed of a CPU, a ROM, a RAM, etc., not shown. Therefore, the ROM corresponds to a computer readable non-transitory recording medium.

Specifically, the controller 3 is provided with a drive unit composed of an inverter circuit or the like, and drives the motor 12 based on the rotational position of the motor detected by an encoder 17 provided corresponding to each motor 12 by, for example, feedback control.

The teaching pendant 4 is formed, for example, in a generally rectangular box shape, and is formed in such a size that an operator can operate it while carrying it. The teaching pendant 4 is provided with various key switches, touch panels, and the like, and the user performs teaching using the key switches, touch panels, or the like.

Figure 5:
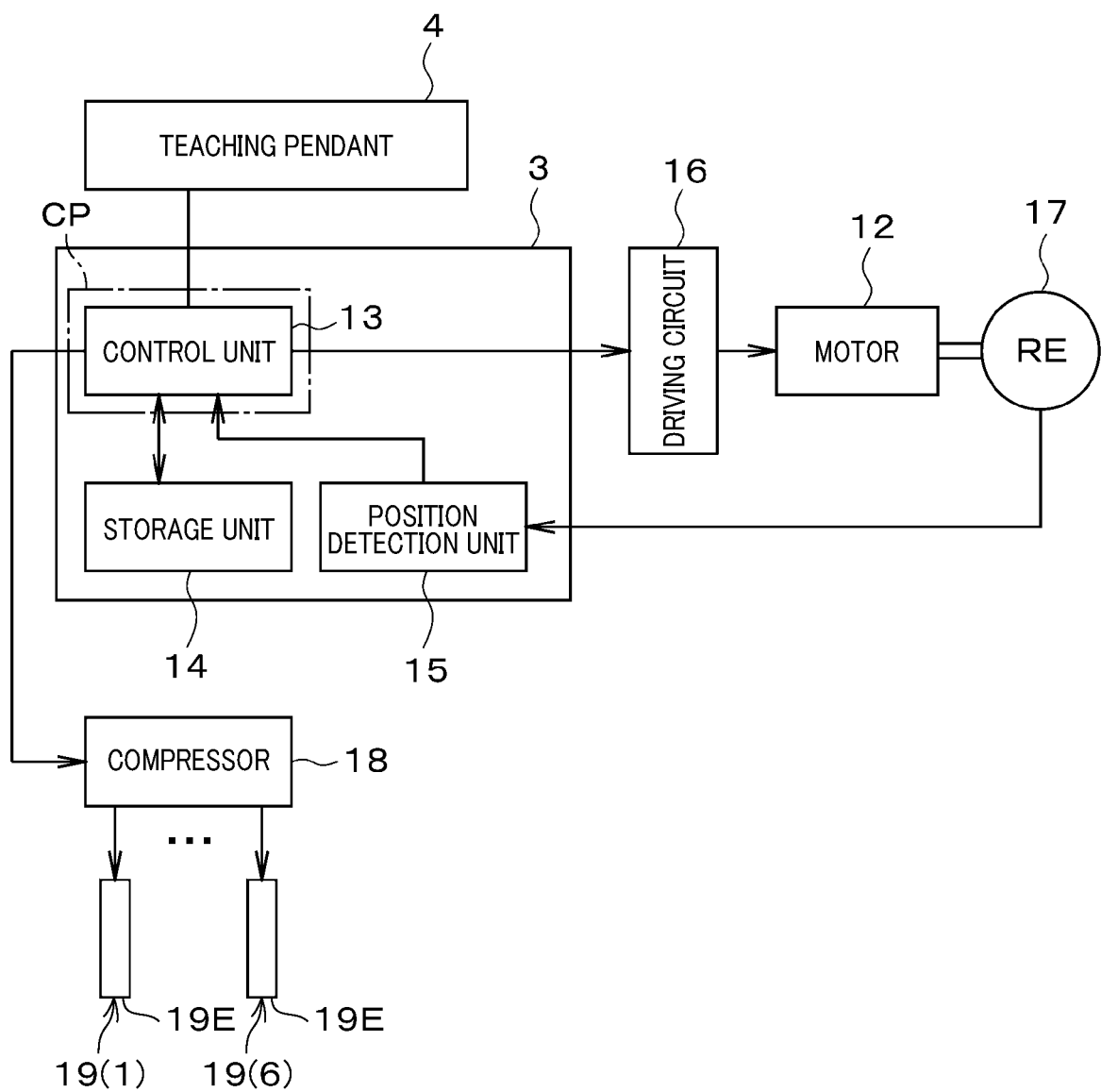
FIG. 5 is a functional block diagram illustrating a configuration of a controller.

As shown in FIG. 5, the controller 3 includes a control unit 13 mainly constituted of a CPU, a storage unit 14, and a position detection unit 15. The control unit 13 is configured to control the entirety of an industrial robot device 1. The control unit 13 is connected to the storage unit 14, the position detection unit 15, the teaching pendant 4, and the driving circuit 16 of a motor 12. In the storage unit 14, parameters such as maximum acceleration (+a), maximum deceleration (−a), maximum speed Vmax, and various software for robot control for the motors 12 for driving the arms 6 to 11 are stored in advance. In addition, in the storage unit 14, an operation program set by the teaching pendant 4, movement path information of the robot tip generated prior to the actual operation, and the like are stored when the robot is actually operated.

A rotary encoder 17 is connected to the position detection unit 15, the rotary encoder 17 being connected to each rotary shaft of the motor 12 corresponding to a shoulder 6, arms 7 to 9 or the like. The position detection unit 15 detects the rotation angle of the motor 12, that is, the axis value, based on the rotation detection signal input from the rotary encoder 17, and provides the rotation position information to the control unit 13. When the control unit 13 calculates the rotation angle of the corresponding arm or the like from the rotation angle information of the motor 12, the control unit 13 compares the calculated rotation angle with the target angle and provides a current command value to the driving circuit 16 in accordance with the extent of the difference between the calculated rotation angle and the target angle. Then, the drive circuit 16 supplies a current to the motor 12 in accordance with the provided current command value. Thus, the rotation of the motor 12 is controlled to rotate each arm 6 to 11 or the like at a target angle.

The control unit 3 controls the flow of compressed air to a plurality of, for example, six suction pads 19 (1) to (6) disposed on the hand 21 via a compressor 18 to control suction start and suction stop performed by the suction pads 19. In FIG. 4, the compressor 18 and the like are not shown.

Figure 3:
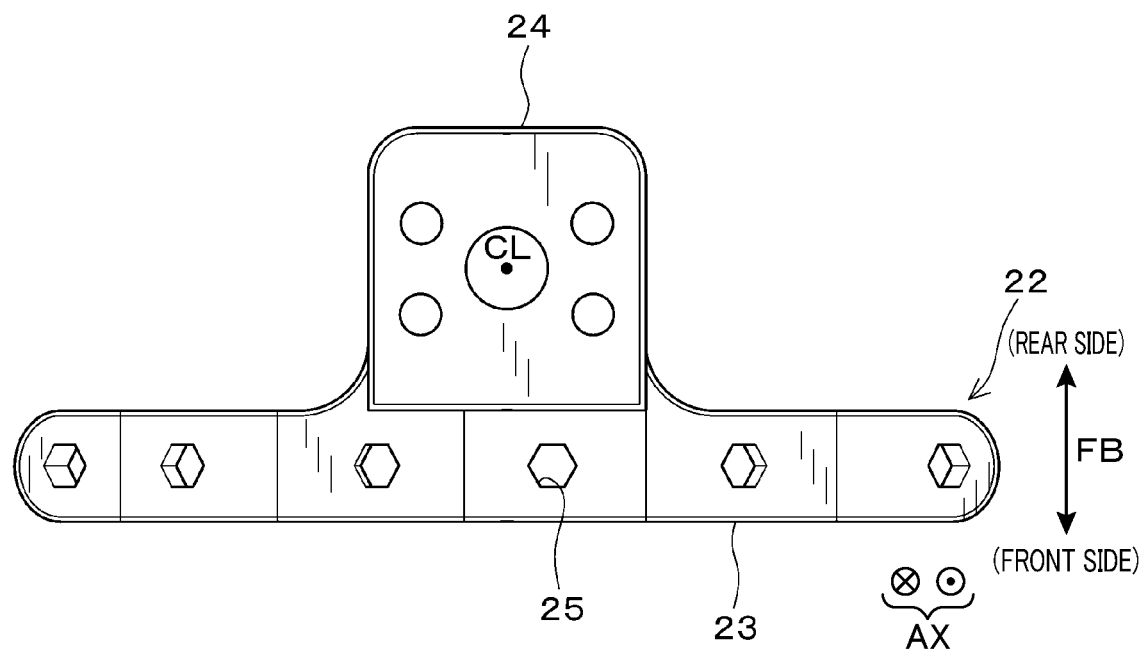
FIG. 3 is a diagram illustrating the base of the hand viewed from below.

As shown in FIGS. 1 to 3, the hand 21 of this embodiment includes a base member (may be simply referred to as a base) 22 and a plurality (here, 6) of suction pads 19. Specifically, the base member 22 is provided with 6 suction pads 19 (1) to 19 (6). In FIG. 1, the left end corresponds to a first end RT, and the right end corresponds to a second end LT. The base member 22 includes a pad attachment portion 23 and a flange mounting portion 24. The pad attachment portion 23 has a substantially long plate-like shape and is curved so as to be convex downwardly in the vertical direction, that is, in the axial direction AX in FIG. 1, and the flange mounting portion 24 has a substantially rectangular shape and is disposed on the central area of the side surface of the pad attachment portion 23. Therefore, the entire base member 22 is formed so as to be curved downward in an arc AC as shown in FIG. 2 at a front position in the front-rear direction FB (see FIG. 3) outside the center axis CL of the flange 11. Of course, since the arm of the robot is moved during the attachment operation, the meaning of the downward is the state shown in FIGS. 1 and 2.

As shown in partial views (A) and (B) of FIG. 2, the base member is conceptually represented by one embodiment and one modification thereof, and is positioned at an offset radially outward relative to the central axis CL (axial direction AX) of the flange 11. Therefore, as shown in FIGS. 2 and 3, the base member 22 has a longitudinal direction FB as its offset single element.

As described above, the base member 22 is curved so as to smoothly draw an arc AC as a whole in a vertical direction (along the axial direction AX) perpendicular to the longitudinal direction FB in one operation posture for attaching the sealing material. In drawing this arc AC, as one embodiment, the entire linear elongated base member 22 in a side view may be smoothly curved to have an arcuate arc AC shown in FIG. 1 (see FIG. 2A). On the other hand, the linear elongated base member 22 as viewed from the side may be divided into a plurality of plate portions PB, the plate portions PB may be bent and formed with small angles θ1, θ2, and substantially an arcuate arc AC may be provided as a whole (see FIG. 2B). As will be described later, the position and orientation of the base member 22 in the operating space S is changed in accordance with the movement of the tip of the robot arm by the attachment control, but the position and orientation are controlled while being offset in the radial direction from the tip of the robot arm, that is, the center axis CL of the flange 11.

Thus, since the base member 22 has an arc AC or substantially an arc AC, as will be described later, any one of the plurality of suction pads 19 attached to the base member 22 can protrude (closer to) a target 32 than the other suction pads 19 toward the desired surface of the target 32, and the sealing material can be partially attracted by the protruded suction pads 19.

Each of the suction pads 19 (1) to (6) is attached via hexagonal attachment holes 25 formed in the pad attachment portion 23. The base member 22 is attached to the flange 11 through the flange mounting portion 24. Each suction pad 19 has a suction end 19 E abutting on an object OB at its tip end (see FIG. 1). Therefore, a virtual suction surface PIM can be assumed to pass through the suction end 19 E. Therefore, according to the present embodiment, since the plurality of suction pads 19 separated by the respective predetermined distances on the curved base member 22 are arranged, the suction surfaces PIM assumed to be provided at the tips of the suction pads 19 are not parallel to each other but intersect each other at a predetermined angle.

The system configuration as a sealing material attachment system executed by the robot system 1, provided by the above configuration, is generally configured to have two directions consisting of a first edge direction E1 and second edge direction E2 (see FIG. 9) that intersect each other, the first edge direction E1 is elongated and longer than the second edge direction E2, to attach the sealing material 31 having an attachment surface to the object 32. The system includes: a robot 2 provided with a hand 21 movable at an arm tip; a plurality of suction pads 19 each of which has a virtual suction surface PIM passing through a suction end 19 E capable of abutting on an object 32; a base 22 attached to the hand 21 and supporting the plurality of suction pads 19 and attached so that virtual planes including the suction surface PIM of the suction pads 19 intersect each other on an operation space S of the hand; and a control device 3 which controls the operation of the hand 21 of the robot 2 and controls the suction of the sealing material 31 of the respective suction pads 19 independently of each other. The control device 3, 4 has a suction command means for functionally suctioning the sealing material 31 to each suction surface of the plurality of suction pads 19, a positioning control means for controlling the position and orientation of the suction pads 19 in the operating space S of the base 22 for each partially attaching operation of the sealing material 31 so that the suction surface of one of the plurality of suction pads is arranged to be face the predetermined attachment position on the object 32, an attachment control means for partially attaching the attachment surfaces of the sealing material 31, to which the suction pad is suctioned, to the attachment position on the object 32 for each partial attachment operation of the sealing material 31, and a first suction stop means for stopping suction operated by the one of the plurality of suction pads for each partial attachment operation of the sealing material 31 after finishing partial attachment operated by the attachment control.

The above configuration will be described with reference to the configuration and features of the functions of the plurality of suction pads 19.

Figure 10:
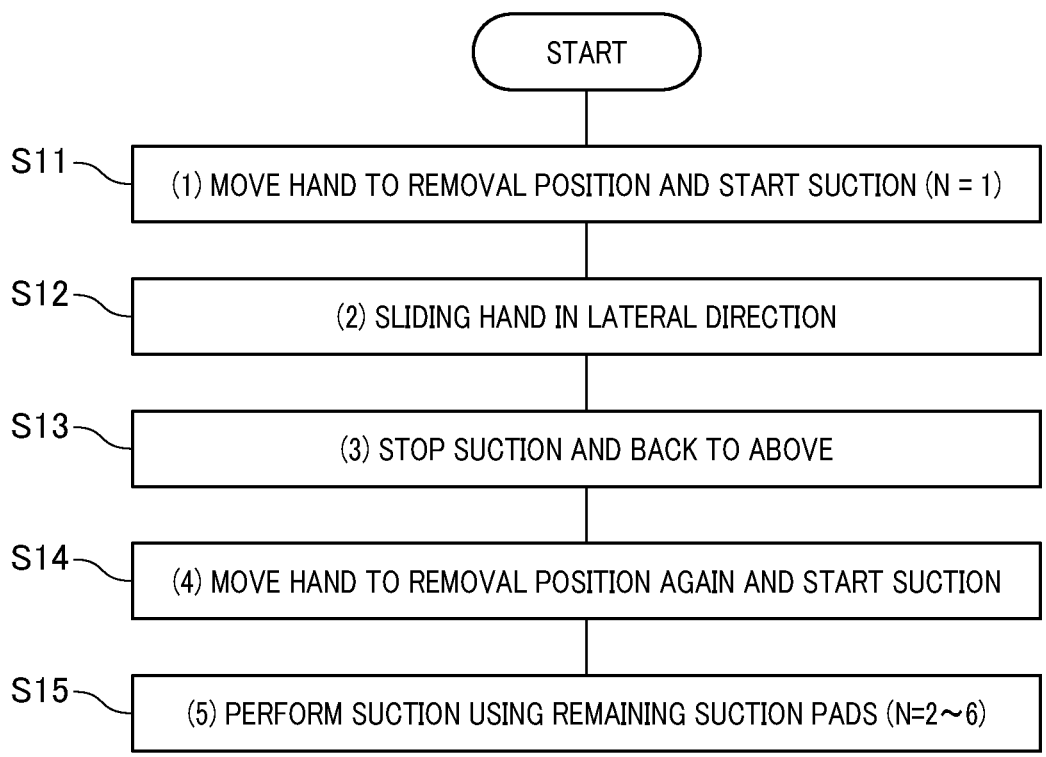
FIG. 10 is a flowchart showing details of a process of removing the sealing material.
Figure 11:
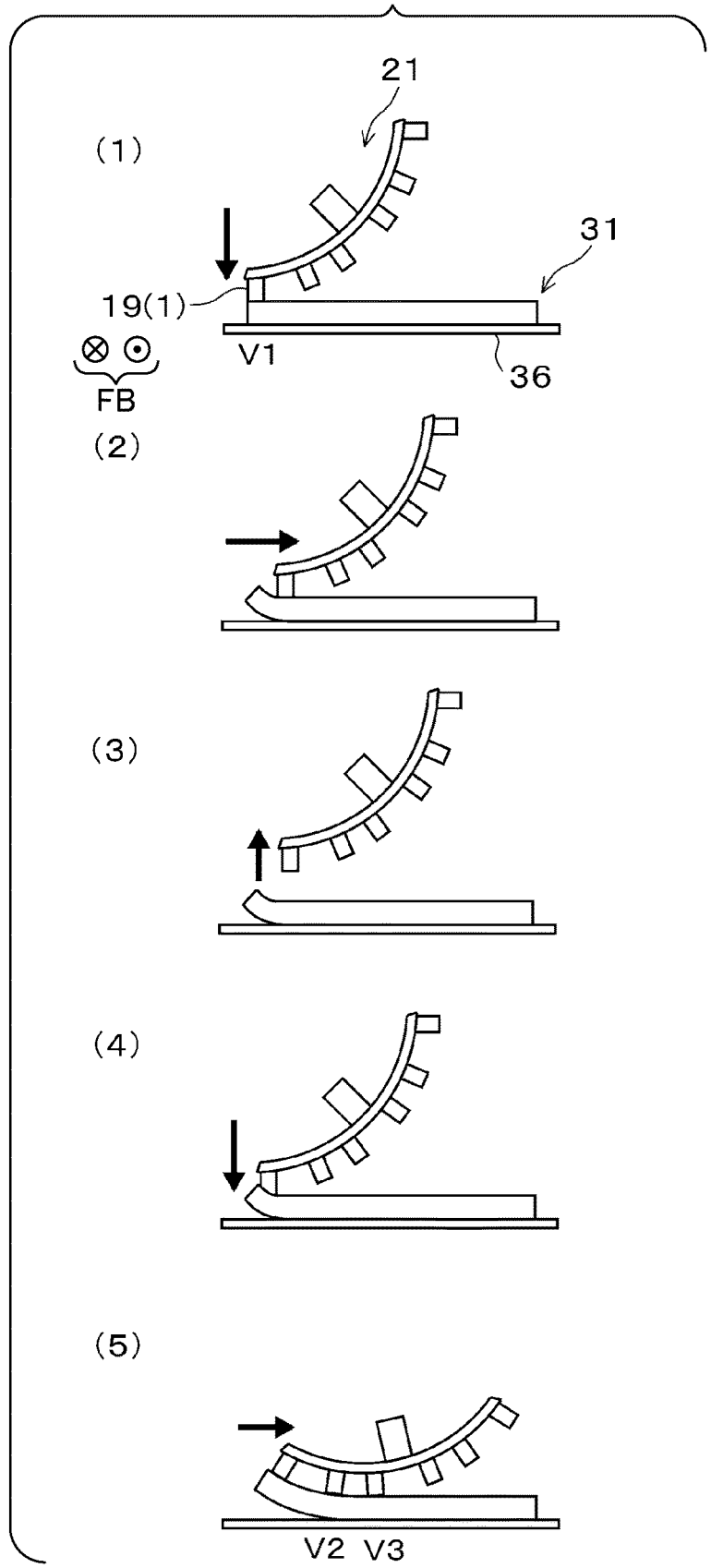
FIG. 11, parts (1) to (5) thereof, is a set of diagrams showing an operation performed by the hand corresponding to each process of the flowchart shown in FIG. 10.

The distance between the suction pad 19 (1) to the suction pad 19 (6) mounted on the pad mounting portion 23 is set to be substantially equal to the length of the elongated (narrow rectangular, strip-like, linear) sealing material 31 shown in FIG. 10 or the like to which suction and attachment is performed by the hand 21. The slenderness is designed in consideration of the number of suction pads, the thickness of the seal, the purpose of use of the seal, the place of application, and the like.

The intervals at which the suction pads 19 (1) to 19 (6) are attached to the pad attachment portion 23 are set according to points at which the attachment angle changes in the same plane when the sealing material 31 is attached to an attachment object 32. Although the attachment object 32 shown in FIG. 13 or the like is actually a vehicle door or the like and has a complicated three-dimensional shape, it is schematically shown as a rectangular parallelepiped to simplify the description.

The degree of curvature of the base member 22 is such that the angle θ (see FIG. 1) formed by crossing the axis JK (see FIG. 1) of the suction pad 19 (1) on the left end (first end: RT) side in FIG. 1 and the axis JK (see FIG. 1) of the suction pad 19 (6) on the same right end (first end: LT) side is less than 90 degrees. This is in consideration of the balance between the overall size of the hand 21 and the movable area in the operating space 5, and if the hand can be made smaller, the angle θ may be set to 90 degrees or more. A hose 26 through which compressed air generated by the compressor 18 flows is connected to the upper end side of each suction pad 19 (1) to 19 (6).

Figure 6:
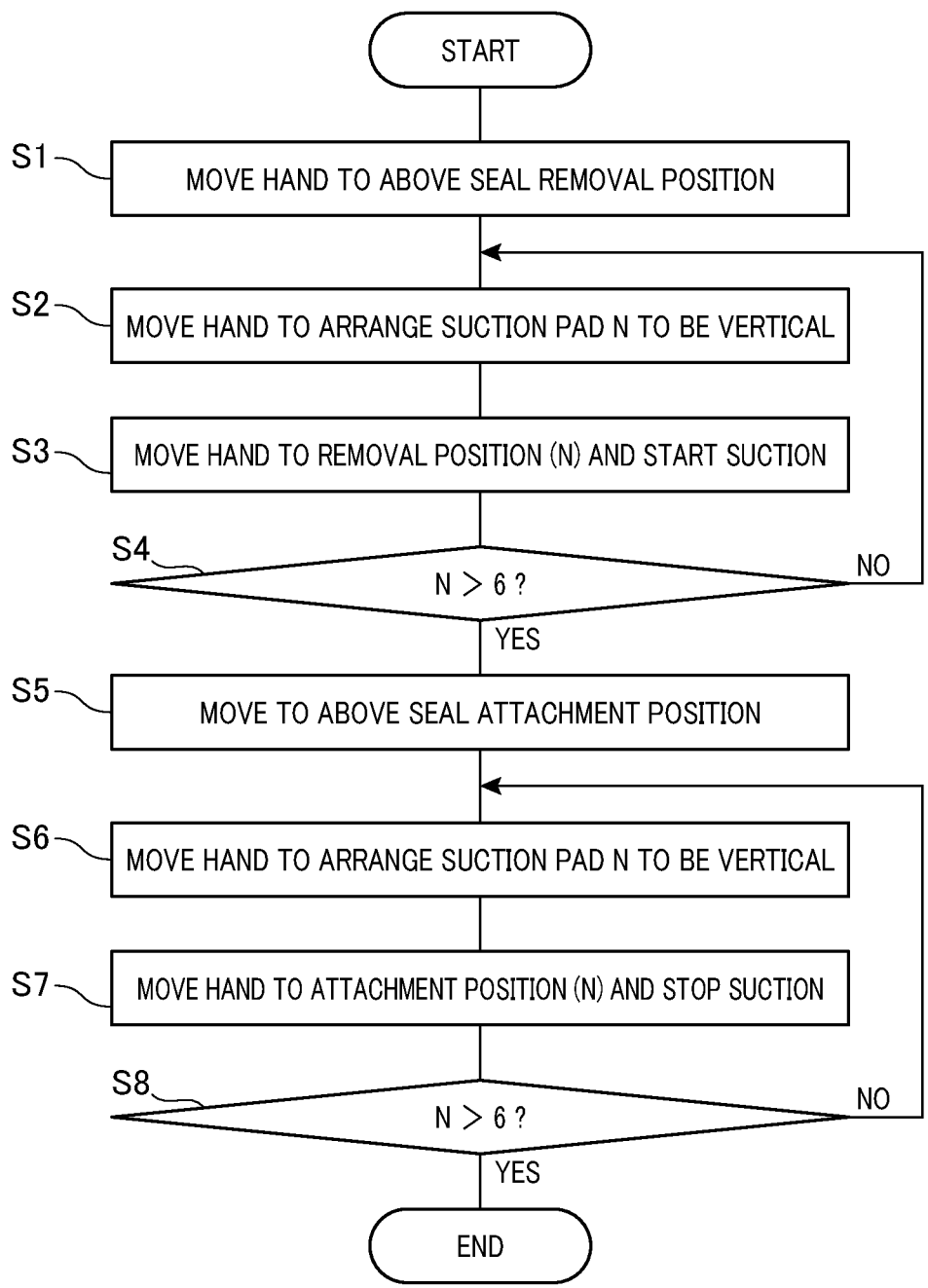
FIG. 6 is a flowchart showing the outline of a procedure performed by the controller.
Figure 7:
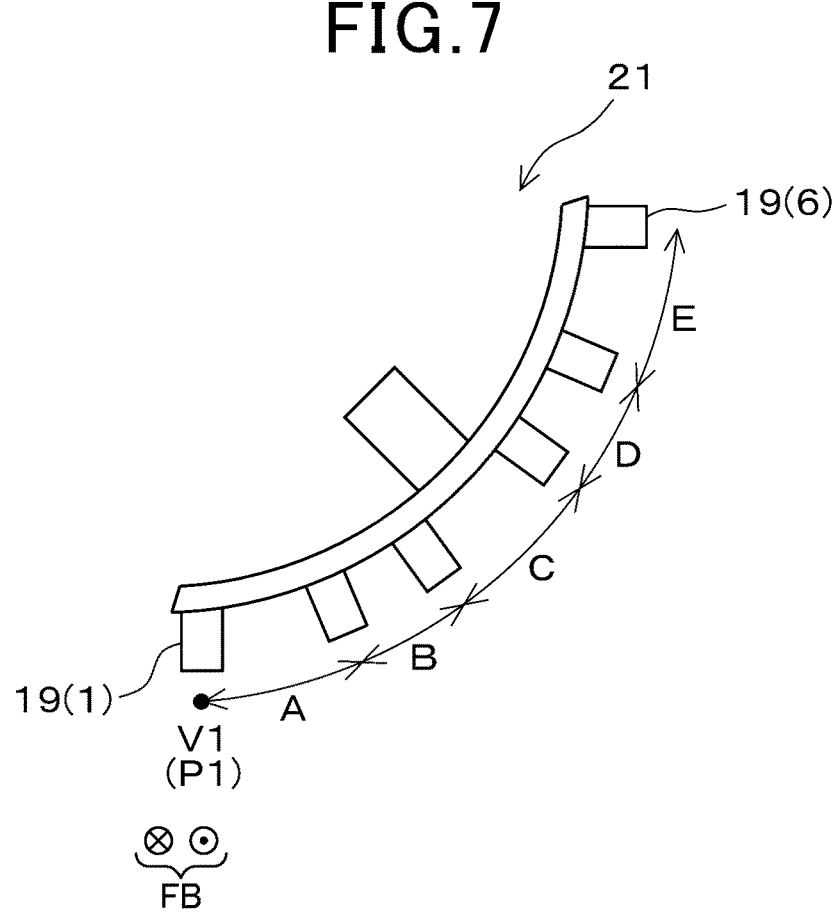
FIG. 7 is a diagram showing a state in which the hand is controlled such that the axis of the suction pad 19 (1) is perpendicular to an object.

With reference to FIGS. 6 to 16, effects of the present embodiment will be described. Hereinafter, 6 points at which the sealing material 31 is suctioned are denoted as V1 to V6, and 6 points at which the sealing material 31 is attached to the attachment object are denoted as P1 to P6. As shown in FIG. 7, in each of the suction pads 19 (1) to 19 (6), A to E are defined as sections separated by two adjacent pads (1)-(2), (2)-(3), . . . (5)-(6). The sections A to E are sections for partially attaching the sealing material 31.

<Removal and Suction of Sealing Material 31>

Figure 9:
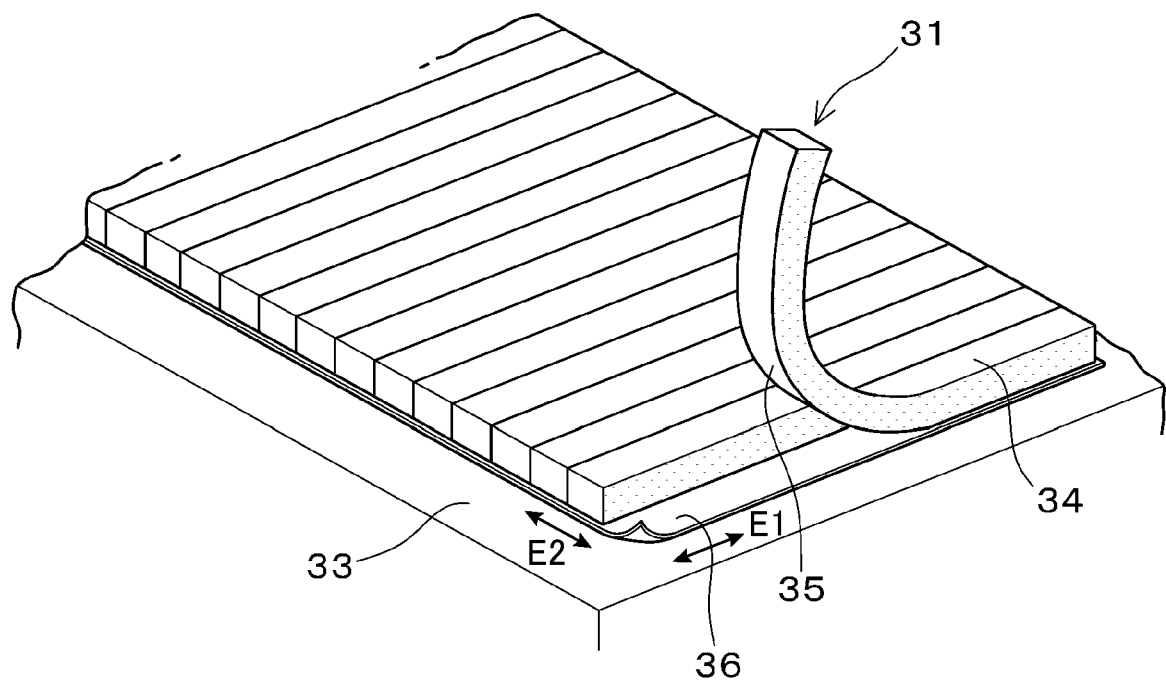
FIG. 9 is a perspective view showing a state in which a sealing material is arranged on a workbench.

FIG. 6 is a flowchart showing the procedure performed by the control unit 13 of the controller 3. The control unit 13 first moves the hand 21 above the position where the sealing material 31 is removed (S1). As shown in FIG. 9, the sealing material 31 is disposed on a workbench 33, and is in contact with a mount 36 with a soft portion 34 facing upward and an adhesive surface 35 facing downward. In this state, each sealing material 31 is cut individually in advance into an elongated shape in plan view.

Then, the control unit 13 performs control so that the axis JK (see FIG. 1) of the suction pad 19 (N) is vertical (S2). Here, the pointer N is a variable having values 1 to 6 and the initial value is "1", and as shown in FIG. 7, the robot 2 inclines the hand 21 so that the axis JK (see FIG. 1) of the suction pad 19 (1) is vertical. At this time, the axes JK of the other suction pads (2) to (6) are not perpendicular and do not face the suction surface of the suction pad 19 (1). Then, the suction pad 19 (1) is moved to the removal position V (1) of the sealing material 31. Since the suction surface of the suction pad 19 (1) is arranged to be face a removal position V (1), the suction surface is brought close to the removal position V (1), and suction is performed by the suction pad 19 (1) (S3). At this point, the pointer N is incremented. If pointer N does not exceed 6 (S4: NO), the process returns to step S2, and the same process is performed for the next suction pad 19 (2).

Figure 8:
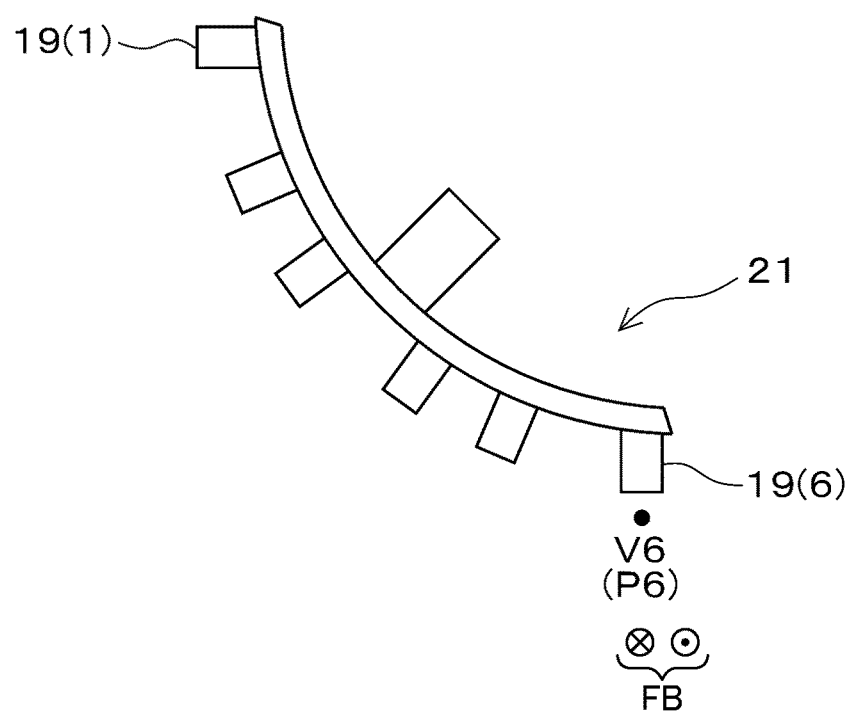
FIG. 8 is a diagram showing a state in which the hand is controlled such that the axis of the suction pad 19 (6) is perpendicular to the object.

When the loop of steps S2 to S4 is repeated to produce an answer "YES" in step S4, the hand 21 determines that the axis JK of the suction pad 19 (6) is vertical, as shown in FIG. 8, and takes out the sealing material 31 at this point. The whole suction is completed. Details of the process of removing the sealing material 31 will be described with reference to FIGS. 10 and 11. In FIG. 6, an outline of the process of removal of the sealing material has been described, but in practice, detailed control is applied to ensure the removal of the sealing material 31. That is, as shown in FIG. 9, not all the sealants 31 are sufficiently cut, and it is assumed that a part of the sealants 31 may be incompletely cut, and it may be difficult to peel the sealants from the mount 36 in such a state.

Then, when the suction pad 19 (1) is moved to the removal position V (1) to suction the sealing material 31 (S11), the control unit 13 slightly slides the hand 21 along the direction in which the sealing material 31 is arranged (S12). As a result, the first end of the sealing material 31 is reliably peeled off from the mount 36. The suction pad 19 (1) stops the suction, and then the control unit 13 moves the hand 21 upward (S13) to move the suction pad 19 (1) again to the removal position V (1) to perform suction (S14). Then, suction using the remaining suction pads 19 (2) to (6) is performed in accordance with the flows of FIG. 6 (S15).

<Attachment of Sealing Material 31>

Figure 12:
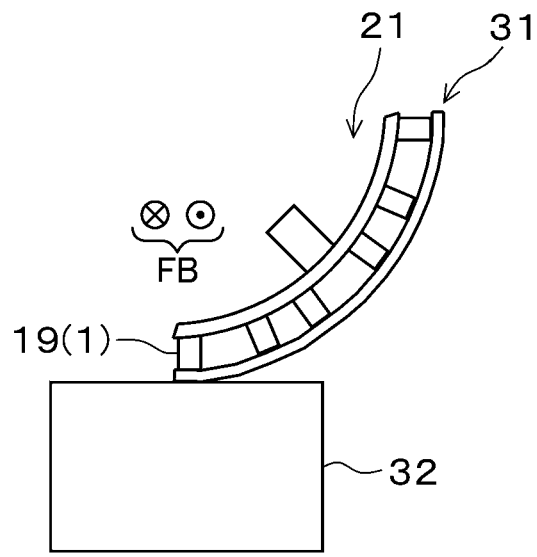
FIG. 12 is a diagram schematically showing a state in which the sealing material is attached to the attachment position P (1).

Now, FIG. 6 will be referred to again. As described above, the entire sealing material 31 is suctioned by the hand 21, and the sealing material 31 is attached to the attachment object 32. The pointer N is set to the initial value 1 again. When the control unit 13 moves the hand 21 above the attachment object 32 (S5), the hand 21 is tilted so that the axis JK of the suction pad 19 (1) is vertical (S6). The suction pad 19 (1) is moved to the attachment position P (1) on the sticking object 32 to perform the attachment operation. After finishing the attachment operation, suction by the suction pad 19 (1) is stopped (S7). This state is shown in FIG. 12. If the pointer N is incremented at this point and does not exceed 6 (S8; NO), processing returns to step S6 and the control unit 13 performs the same processing for the next suction pad 19 (2).

Figure 13:
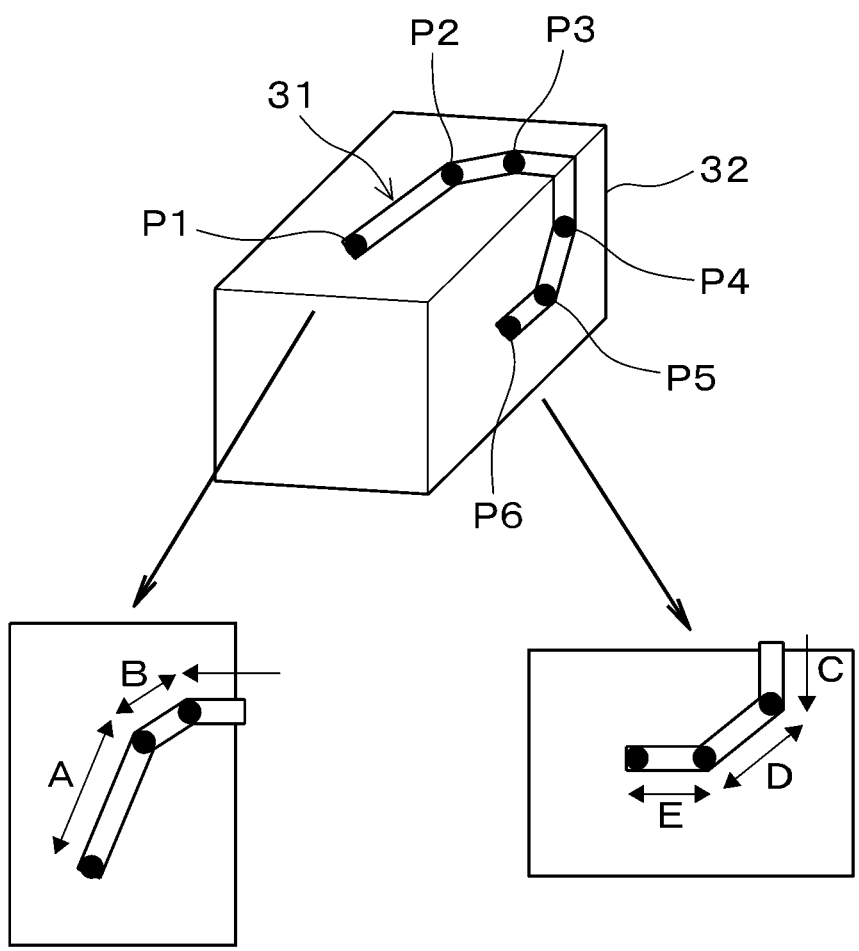
FIG. 13 is a perspective view showing a state in which the sealing material is completely attached to the attachment object, together with a plan view and a side view.

By repeating steps S6 to S8, for example, as shown in FIG. 13, the sealing material 31 is sequentially attached to each of the attachment positions P (1) to (6). That is, the sealing material 31 is attached at part of the attachment object 32 at each section A to E, and when the attachment is performed at the attachment position P (6), the operation is completed. For example, in the section B subsequent to the section A, the attachment angle of the sealing material 31 changes in the same plane. However, as shown in FIG. 14, it is taught in advance that the attachment is performed in such a state where the center line of the pad attachment portion 23 aligns with the center line of the sealing material 31 in each of the sections A and B.

Figure 15:
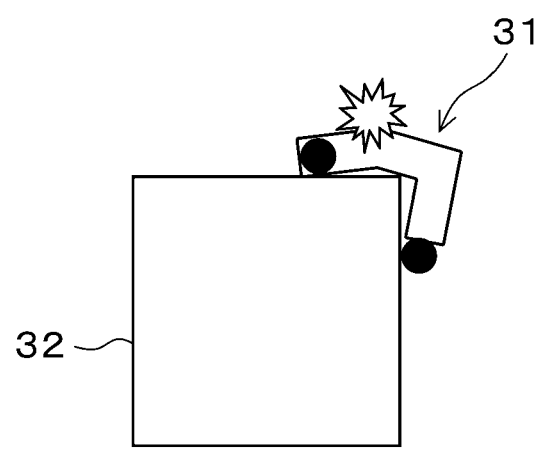
FIG. 15 is a diagram showing a state in which the sealing material is wrinkled when it is attached from the position P (3) to the position P (4).

Details of the process of attaching the sealing material 31 will be described with reference to FIGS. 15 and 16. In the attachment pattern shown in FIG. 13, in the section C which is a section which extends between the positions P3 and P4, the attachment angle is changed by 90 degrees between the positions P3 and P4, when viewed from the front of the attachment object 32. In such a section C, when the hand 21 is merely moved from the position P3 to the position P4, it is likely that the seal material 31 will be left in a wrinkled state as shown in FIG. 15.

Figure 16:
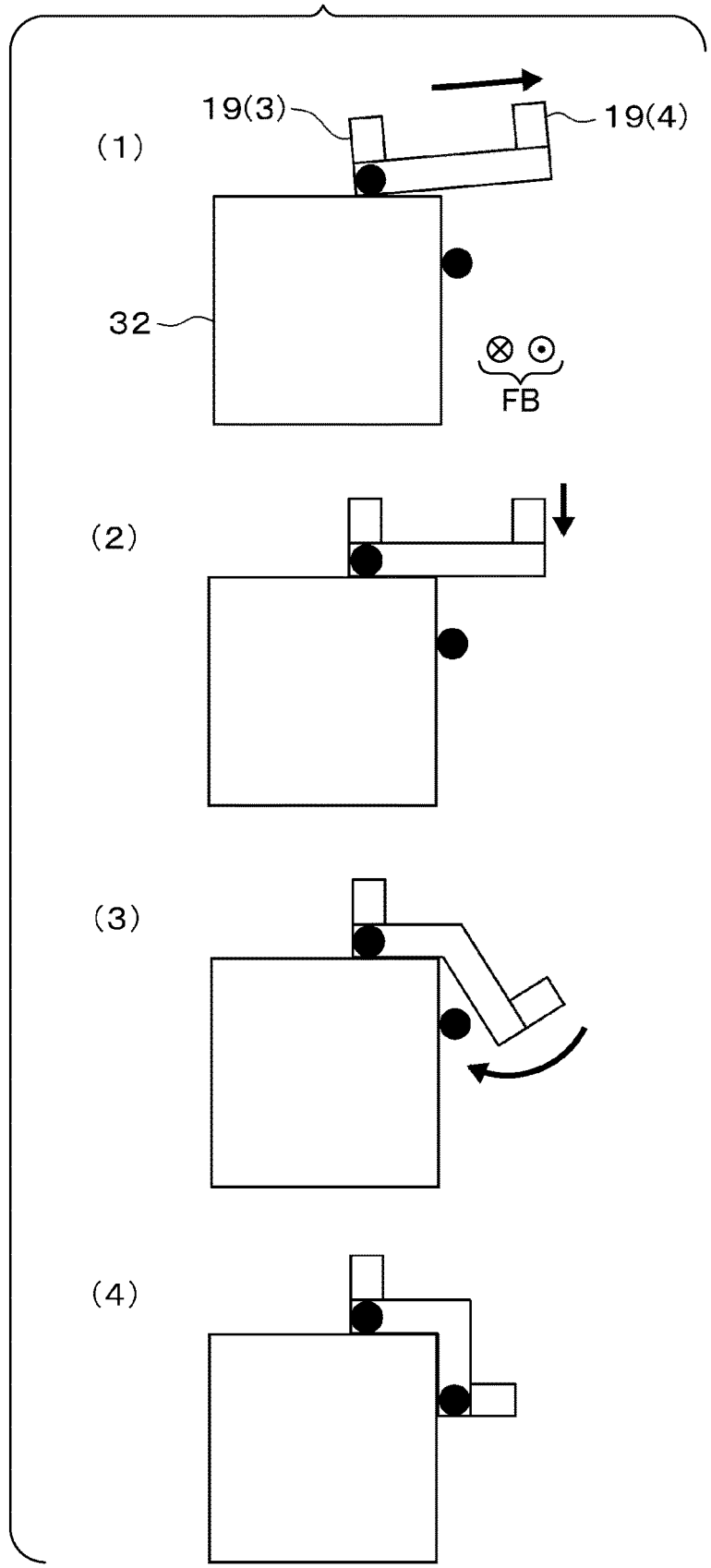
FIG. 16, parts (1) to (4) thereof, is a set of diagrams illustrating control for preventing the sealing material from being wrinkled when it is attached from the position P (3) to the position P (4).

Therefore, as shown in FIG. 16, when attachment is performed at the position P3 using the suction pad 19 (3) and then the hand 21 is moved to the next attachment position P4, the sealing material 31 is stretched, for example, by several mm in the direction indicated by the arrow in FIG. 16 to generate a slight tension in the sealing material 31. In FIG. 16 (1), the sealing material 13 is stretched to the rightward direction in the drawing, and in FIG. 16 (2), it is stretched to the downward direction in the drawing. Then, in FIG. 16 (3), the slight tension in the sealing material 31 is maintained until immediately before the attachment of the sealing material 31 to the attachment position P4, and then is released at the time of attaching the sealing material 13 to the attachment position P4. Therefore, the sealing material 31 is attached to the attachment object without having any wrinkles as shown in FIG. 16 (4).

Figure 14:
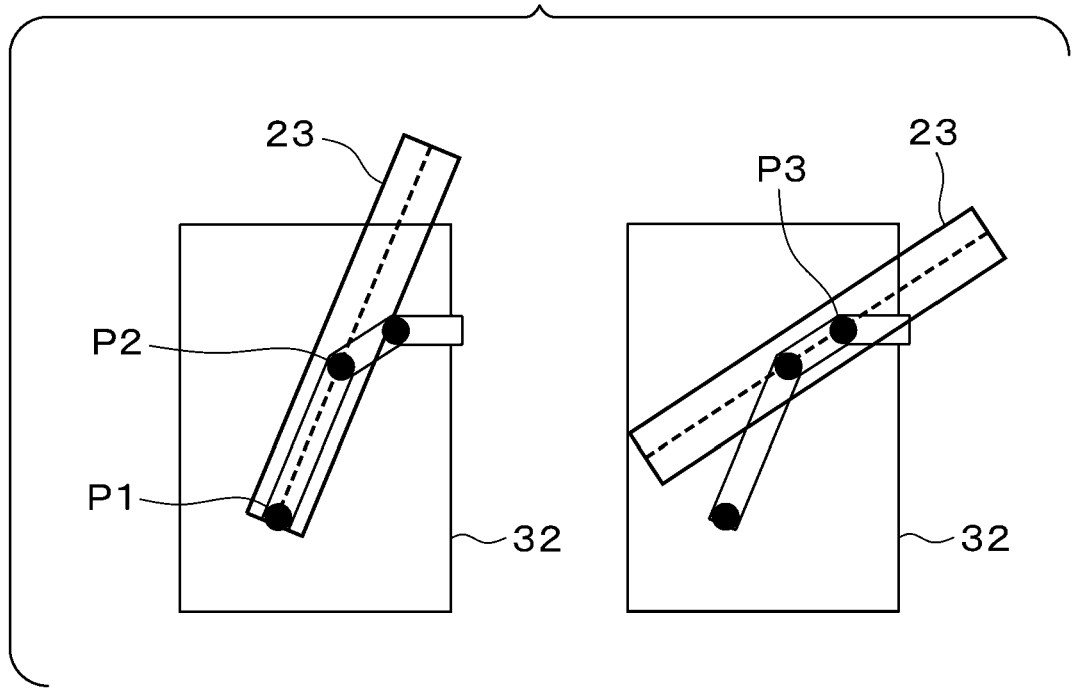
FIG. 14 is a set of diagrams illustrating control for changing the attaching direction of the sealing material between the position P (1) to P (2) and the position P (2) to P (3).

Note that, as shown in FIG. 14, also when the attachment angle changes from the section A to the section B in the same plane, the sealing material 31 may be wrinkled similarly, so that it is necessary to perform the same process as in FIG. 16.

In the foregoing attachment control, processing at steps S1 to S4 executed by the controller 3 functionally realize suction command means and a first step, processing at steps S5 and S6 executed by the controller 3 functionally realize positioning control means and a second step, processing at step S7 executed by the controller 3 functionally realizes attachment control means and a third step, and processing at steps S7 and S8 executed by the controller functionally realize suction stop means and a fourth step. In addition, processing at step S12 executed by the controller 3 functionally realizes tension control means.

As described above, according to the present embodiment, the hand 21 of the robot 2 is provided with the base member 22 curved so as to be convex downward, and suction pads 19 (1) to 19 (6) are disposed on the lower surface side of the base member 22. When the sealing material 31 is suctioned by the suction pads 19 (1) to (6), the controller controls the suction surface of the suction pad 19 (1) to be arranged to face the corresponding attachment position P (1) of the attachment object 32. Then, the controller 3 executes the operation of stopping the suction by the suction pad 19 (1) after the sealing material 31 is partially attached to the attachment object 32. This operation is performed to the suction pads 19 (1) to (6) by sequentially switching the suction pads 19 (1) to (6).

With such a structure, by changing the angle of the base member 22 having a curved shape, one of the plurality of suction pads 19 is arranged to face a portion to be suctioned, and the elongated (linear) sealing material 31 can be suctioned by each of the suction pads 19 at individual points. Therefore, the entire sealing material 31 can be easily suctioned only using the hand 21 of the robot 2.

Similarly, when the sealing material 31 is attached to the attachment object 32, by sequentially executing the operation in which one of the plurality of suction pads 19 is arranged to face a portion to be suctioned and then stopping the suction between the suction pad and the sealing material, the sealing material 31 can be attached to each part between the two suction pads 19. Thus, the work of attaching the elongated sealing material 31 to the attachment object 32 can be automated by using the robot 2. Further, if the attachment object 32 has a three-dimensional shape, the attachment of the sealing material 31 in a three-dimensional manner is performed with ease.

The suction pads 19 (1) to (6) are disposed on the pad attachment portion 23 of the base member 22 to be in alignment with the position where the angle at which the sealing material 31 is attached to the attachment object 32 changes in the same plane. Therefore, the robot 2 can perform control for changing the attachment angle of the sealing material 31 in accordance with a position where suction by the corresponding suction pad 19 is stopped, resulting in ease of teaching.

To suction the sealing material 31, the controller 3 first suctions a first end of the sealing material 31 using the suction pad 19 (1), moves the hand 21 in the direction in which the sealing material 31 is arranged by the distance in which the first end is to be peeled from the mount 36, and stops the suction. Then, the first end of the sealing material 31 is suctioned again by the suction pad 19 (1), and the sealing material 31 is sequentially suctioned using the remaining suction pads 19 (2) to (6). Accordingly, the entire sealing material 31 can be easily peeled off and removed from the mount 36.

When the controller 3 moves the hand 21 by a distance in which the first end of the sealing material 31 is to be peeled off from the mount 36, if, for example, wrinkles are formed on the sealing material 31 or the suction position deviates from the actual suction position of the suction pad 19 (1) provided on one end side, such a state can be eliminated by redoing the suction using the suction pad 19 (1).

Further, when the sealing material 31 is partially attached to one attachment position P (n), the controller 3 stretches the sealing material 31 in a direction toward the next attachment position P (n+1) to a degree that tension is generated in the sealing material 31, and then moves the hand 21 to the attachment position P (n+1). Thus, the sealing material 31 can be prevented from being attached with wrinkles.

The present invention is not limited to the embodiments described above or described in the drawings, but may be modified or extended as follows.

The processes in steps S13 and S14 may be performed as necessary.

The first end of the sealing material 31 may be peeled off using the suction pad 19 (6). In this case, when the removal of the sealing material 31 is completed, the axis JK of the suction pad 19 (1) is vertical. Therefore, the attachment of the sealing material 31 can be immediately started from the attachment position P (1) while maintaining the angle of the hand 21, resulting in efficient suction and attachment of the sealing material 31.

The sealing material may be attached two-dimensionally or one-dimensionally to the attachment object.

The number of suction pads 19 may be appropriately changed according to the individual design.

The pad attachment portion of the base member may be configured such that the interval between the suction pads can be modified.

In addition, the pad attachment portion of the base member may be partially configured such that the plurality of suction pads simultaneously face the suction position of the sealing material. That is, the shape of the base member is not limited to a shape curved so as to be convex in a predetermined direction, and one or more virtual suction surface PIM each including a suction end 19 E of the suction pad may virtually intersect each other in the operation space S. For example, plate portions having a plurality of straight line portions may be connected to each other at an angle to form a substantially arc shape. One example is the structure shown in part (B) of FIG. 2, which has already been described.

Further, the hand 21 according to the above-described embodiment is configured to be provided with the base member 22 which is a curved or substantially curved member for holding the plurality of suction pads 19 with various different angles of the axes JK. The structure of the base member 22 is not necessarily limited thereto, and for example, the curved or substantially curved member may be physically divided into a plurality of plate portions as described above, and the plurality of plate portions may be collectively held by the flange mounting portion 24.

The sealing material is not limited to that used for the door of the vehicle, and may be used for decoration.

REFERENCE SIGNS LIST

In the drawings, numeral 1 denotes a robot system, numeral 2 denotes a robot, numeral 11 denotes a flange, numeral 19 denotes a suction pad, numeral 21 denotes a hand, numeral 22 denotes a base member, numeral 23 denotes a pad attachment portion, numeral 31 denotes a sealing material, and numeral 32 denotes an attachment object.

What is claimed is:

1. A sealing material attachment system for attaching an elongated sealing material, which has a first edge direction and a second edge direction that intersect each other, the first edge direction being longer than the second edge direction, and has an attachment surface, to an object, the system comprising:
a robot having a hand which is movable at a tip of an arm of the robot;
a plurality of suction pads each having a suction surface at a tip of the suction pad, the suction surface passing through a suction end capable of abutting on the object;
a base attached to the hand, supporting the plurality of suction pads, and attached so that angles of virtual planes including suction surfaces of the suction pads intersect each other on an operating space of the hand; and
a control device that is operable by way of a previously-set computer program and that, by executing the computer program, controls an operation of the hand of the robot and respectively controls suction of the sealing material conducted by each of the plurality of suction pads,
wherein the control device is configured to functionally provide:
a suction command means for suctioning the sealing material to each suction surface of the plurality of suction pads;
a positioning control means for controlling, for each partial attachment operation of the sealing material, the position and orientation of the base in the operation space so that the suction surface of at least one of the plurality of suction pads is arranged to face a predetermined attachment position on the object;

an attachment control means for partially attaching the attachment surface of the sealing material, to which at least one of the suction pads arranged to face the attachment position by the positioning control means is suctioned, to the attachment position on the object, for each partial attachment operation of the sealing material, the sealing material being stretched in a direction forward to a next attachment position to a degree that tension is generated in the sealing material and moves the hand to the next attachment position; and a first suction stop means for stopping suction operated by at least one of the suction pads for each partial attachment operation of the sealing material after finishing partial attachment operated by the attachment control means, and wherein an operation consisting of partially attaching the sealing material and stopping suction by the suction pad is repeated sequentially from a suction pad provided on a first end side of the base to a suction pad provided on a second end side of the base.

2. The sealing material application system of claim 1, wherein the base holds the plurality of suction pads apart from each other in a predetermined direction, and the sealing material is suctioned by the plurality of suction pads such that the first edge direction and the predetermined direction coincide.

3. The sealing material attachment system according to claim 2, wherein the base has a shape which is curved so as to be convex downwardly in the predetermined direction.

4. The sealing material attachment system according to claim 3, wherein the base is continuously curved in the predetermined direction to form the convex shape, or is partially bent to form the convex shape.

5. The sealing material attachment system according to claim 2, wherein the object has a three-dimensional shape.

6. The sealing material attachment system according to claim 5, wherein the plurality of suction pads are disposed on the base to be in alignment with the position where an angle at which the sealing material is attached to the object changes in the same plane.

7. The sealing material attachment system according to claim 2, wherein the plurality of suction pads are disposed on the base to be in alignment with the position where an angle at which the sealing material is attached to the object changes in the same plane.

8. The sealing material attachment system according to claim 2, wherein, when the sealing material is suctioned by the plurality of suction pads, the suction command means of the control device executes an operation in which a first end of the sealing material in the first edge direction of the sealing material is suctioned by a suction pad provided on one end side of the base first, and the hand is moved in a direction along which the sealing material is arranged by a distance in which the first end of the sealing material is peeled off to sequentially suction the sealing material using remaining suction pads.

9. The sealing material attachment system according to claim 8, wherein the suction command means of the control device stops suction by the suction pad when the hand is moved by a distance in which the first end of the sealing material in the first edge direction is peeled off, and performs suction applied to the first end of the sealing material again using a suction pad provided on one end side of the base to sequentially suction the sealing material using remaining suction pads.

10. The sealing material attachment system according to claim 9, wherein the first end of the sealing material corresponds to the second end side of the base.

11. The sealing material attachment system according to claim 1, wherein the object has a three-dimensional shape.

12. The sealing material attachment system according to claim 1, wherein the plurality of suction pads are disposed on the base to be in alignment with the position where an angle at which the sealing material is attached to the object changes in the same plane.

13. The sealing material attachment system according to claim 1, wherein, when the sealing material is suctioned by the plurality of suction pads, the suction command means of the control device executes an operation in which a first end of the sealing material in the first edge direction of the sealing material is suctioned by a suction pad provided on one end side of the base first, and the hand is moved in a direction along which the sealing material is arranged by a distance in which the first end of the sealing material is peeled off to sequentially suction the sealing material using remaining suction pads.

14. The sealing material attachment system according to claim 13, wherein the suction command means of the control device stops suction by the suction pad when the hand is moved by a distance in which the first end of the sealing material in the first edge direction is peeled off, and performs suction applied to the first end of the sealing material again using a suction pad provided on one end side of the base to sequentially suction the sealing material using remaining suction pads.

15. The sealing material attachment system according to claim 13, wherein the first end of the sealing material corresponds to the second end side of the base.

16. A sealing material attachment control method for attaching a sealing material to an object, the sealing material having an elongated shape having a first edge direction and a second edge direction that intersect each other, the first edge direction being longer than the second edge direction, and having an attachment surface, wherein an attachment system comprises:
a robot having a hand which is movable at a tip of an arm;
a plurality of suction pads each having a suction surface at a tip of the suction pad, the suction surface passing through a suction end capable of abutting on the object;
a base attached to the hand, supporting the plurality of suction pads, and attached so that angles of virtual planes including suction surfaces of the suction pads intersect each other on an operating space of the hand; and
a control device that is operable by way of a previously-set computer program and that, by executing the computer program, controls operation of the hand of the robot and respectively controls suction of the sealing material conducted by the plurality of suction pads, wherein the control device executes:
a first step for suctioning the sealing material to each suction surface of the plurality of suction pads;
a second step for controlling a position and an orientation of the base in the operation space so that the suction surface of part of the plurality of suction pads is arranged to face a predetermined attachment position on the object;

a third step for partially attaching the attachment surface of the sealing material, to which part of the plurality of suction pads arranged to face the attachment position at the second step is suctioned, to the attachment position on the object; and after finishing the third step, the second and the third steps are repeated for each partial attachment operation of the sealing material with respect to any remaining attachment position of the object, and wherein the third step includes a step of stretching the sealing material in a direction forward to a next attachment position to a degree that tension is generated in the sealing material and moves the hand to the next attachment position.

17. The sealing material attachment control method according to claim 11, wherein, when the sealing material is suctioned by the plurality of suction pads, the first step comprises an operation in which a first end of the sealing material in the first edge direction of the sealing material is suctioned by a suction pad provided on one end side of the base first, and the hand is moved in a direction along which the sealing material is arranged by a distance in which the first end of the sealing material is peeled off to sequentially suction the sealing material using remaining suction pads.

* * * * *